Aug. 26, 1969  R. G. HENTSCHEL  3,464,002
LOW Q TEST COILS FOR MAGNETIC FIELD SENSING
Filed Sept. 28, 1967  2 Sheets-Sheet 1

INVENTOR
RUDOLF G. HENTSCHEL

BY
Olsen and Stephenson
ATTORNEYS

Aug. 26, 1969  R. G. HENTSCHEL  3,464,002
LOW Q TEST COILS FOR MAGNETIC FIELD SENSING
Filed Sept. 28, 1967  2 Sheets-Sheet 2

INVENTOR
RUDOLF G. HENTSCHEL
BY
Olsen and Stephenson
ATTORNEYS

United States Patent Office  3,464,002
Patented Aug. 26, 1969

3,464,002
LOW Q TEST COILS FOR MAGNETIC FIELD SENSING
Rudolf G. Hentschel, 2010 Medford,
Ann Arbor, Mich. 48104
Filed Sept. 28, 1967, Ser. No. 670,867
Int. Cl. G01r 33/14; H01f 27/28
U.S. Cl. 324—40                                              18 Claims

ABSTRACT OF THE DISCLOSURE

An eddy current testing instrument operable over a wide frequency range—4 kc. to 40 kc. in one embodiment. A variable frequency AC source is connected to a primary coil to generate an alternating magnetic field. Perturbations introduced by placing a test sample in the field are sensed by a secondary pickup coil magnetically linked to the field whose output is integrated to obtain a signal proportional to the field and compared to the signal from the AC source to determine changes in amplitude and phase of the field caused by the eddy current properties of the sample. Wideband response is obtained by using low Q primary and secondary coils having a Q of 0.1 to 1.0 over the frequency range.

---

Figure 1:
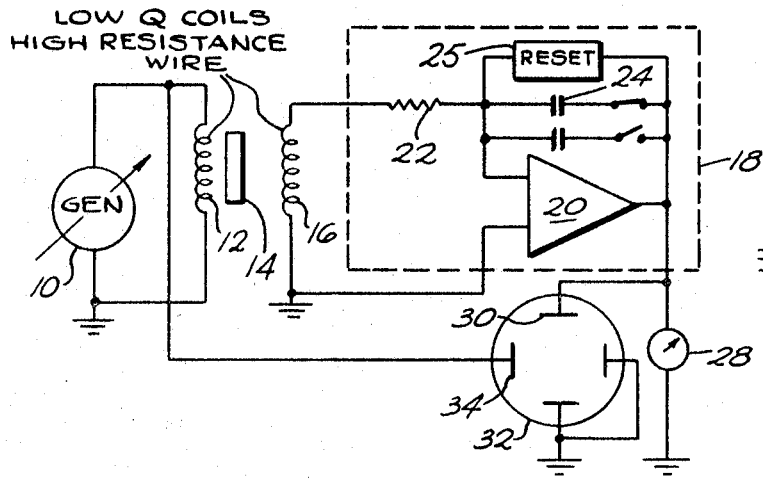

This invention relates to magnetic field measuring instruments and more particularly to test coils, primary-secondary coil arrangements and circuits for the same to generate and sense magnetic fields over a wide frequency range.

Although the present invention will be described herein in connection with eddy current testing instruments for which the invention was conceived and has special utility, the present invention also has utility in a wide variety of other magnetic field sensing applications. The present invention would be useful in B-H loop recorders and in flux gate magnetometers to sense alternating magnetic fields over a wide frequency range. The present invention would also be useful in leakage field detection apparatus to sense magnetic field variations over a wide range of variations in the velocity of a probe and a part having relative motion therebetween.

Test coils in various types of magnetic field measuring instruments have conventionally been wound of copper wire. Eddy current testing instruments, for example, commonly use copper wire test coils in a wide variety of sizes, shapes and winding configurations, connected in various different circuit configurations, depending on the particular test problem. Coil design for eddy current testing depends in part upon the size and geometry of the part to be tested, the field strength and configuration, minimum secondary voltage levels desired and the test frequency selected for a given test problem. Since most of the aforementioned factors dominate the design of a test coil set, the impedances and therefore the Q's of the coils occur more or less accidentally. Normally the coil impedance will be highly inductive and frequency dependent, introducing error into the test signal with variations in frequency. Prior art techniques have generally accepted the impedance resulting from coil based on the aforementioned parameters and thus yield less than optimum results. Attempts have also been made to alleviate the problems associated with a high inductive impedance and impedance variations with frequency to achieve effective wide band operation. For example, the Q of the test coils may be equalized by external circuits at each test frequency as disclosed in my United States Patent No. 3,314,006, granted Apr. 11, 1967.

Commonly eddy current testing instruments available commercially operate only at a single fixed frequency or at most on a small number of fixed frequencies. These frequencies are selected by the instrument manufacturer and thus a purchaser must in turn select an instrument operating at one of the available frequencies which is not necessarily the frequency that could provide optimum results. Thus, only test coils designed to operate at selected frequencies are available from instrument manufacturers, except on a custom basis. This practice was not believed to be objectionable since it has been accepted in the art that good results can be obtained if the frequency available on a commercial machine is merely close to an optimum test frequency. If a purchaser has to test widely different parts at widely separated frequencies, he must either buy several test coils, use the same test coil and accept less useful results or employ special circuits as in the aforementioned United States Patent No. 3,314,006.

Applicant has found that improved eddy current testing can be achieved by careful selection of the test frequency using an instrument whose frequency can be set to any desired frequency over a wide range of test frequencies Such an instrument is also more versatile than the single or multiple fixed frequency instruments now in use. However, a broad-band instrument cannot be used most effectively with prior art test coils selected based on design parameters other than the impedance of the coil. A copper test coil is predominantly inductive and may be used at more than one test frequency. However, inaccuracies are introduced since the response of the coil varies with frequency. Information when a sample is inserted into a copper coil at one freqency will be affected one way or another at that frequency. With the same coil at a different test frequency, the information obtained from the coil when a sample is inserted therein contains not only information about the sample per se but also information caused by inductive impedance variations in the coil. Variations can be substantial since prior art test coils wound of copper wire commonly have a significant Q at operating frequencies. Variation in the coil impedance prevents accurate comparison between tests taken at different frequencies using the same coil unless special precautions are taken to compensate or correct for variations with frequency.

Prior art test coils also have other disadvantages which are caused by impedance variations over a wide frequency range. Inductive impedance variations of the coil also cause transients when test coils are connected and disconnected to and from a source. It is quite often more convenient to generate stable square waves or other complex waveforms, rather than sinusoidal, over a wide frequency range and the impedance variations distort the waveform at any given frequency and even more so with frequency variations. Where the test coil has a significant Q, the coil may be self-resonant at a frequency within the range of test frequencies. The slow response of a high Q coil cannot be tolerated for many applications such as high speed inspection and sorting and it is difficult to match two coils as in a differential coil set-up for eddy current testing.

Thus, the objects of the present invention are to provide magnetic field test coils, either drive coils or sensing coils, and circuits for the same, that eliminate or at least substantially minimize the aforementioned disadvantages of high Q test coils and that provide flat and constant frequency response over a wide frequency range.

A further object of the present invention is to provide an improved eddy current testing instrument that operates accurately and effectively over a relatively wide range of test frequencies by comparison to prior art eddy current testing instruments.

Figure 3B:
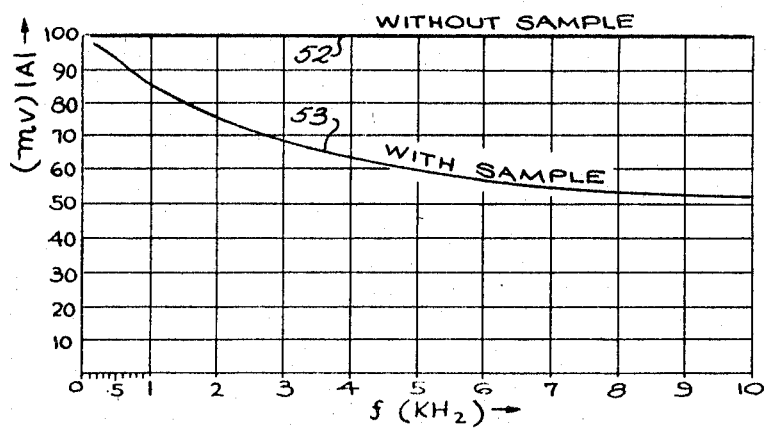
Figure 3A:
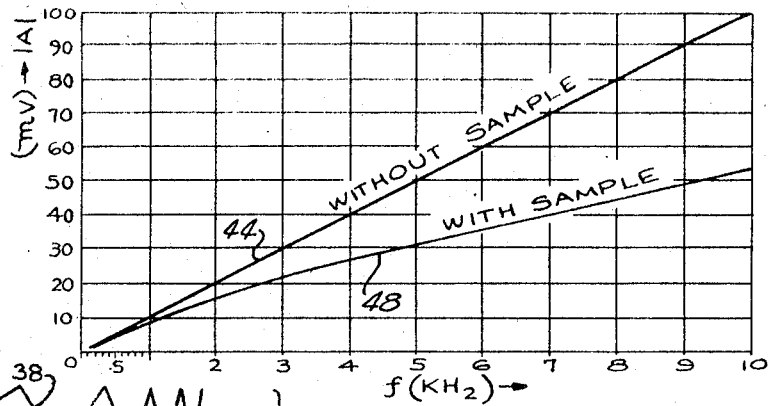
Figure 4:
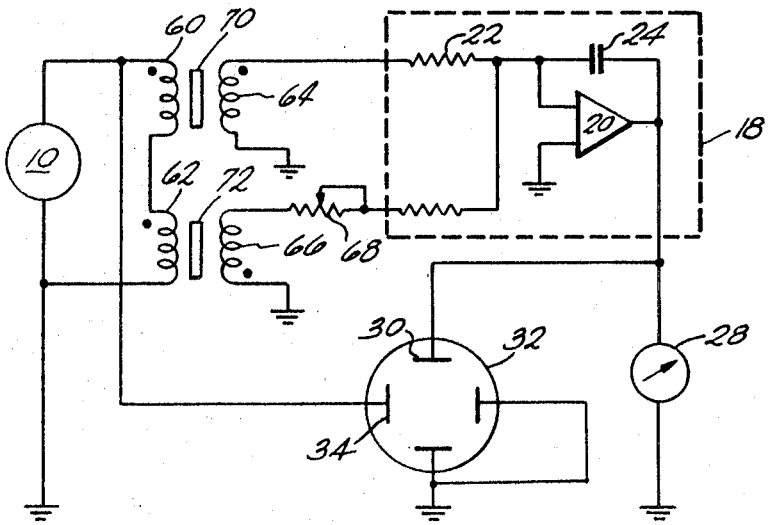
Figure 5:
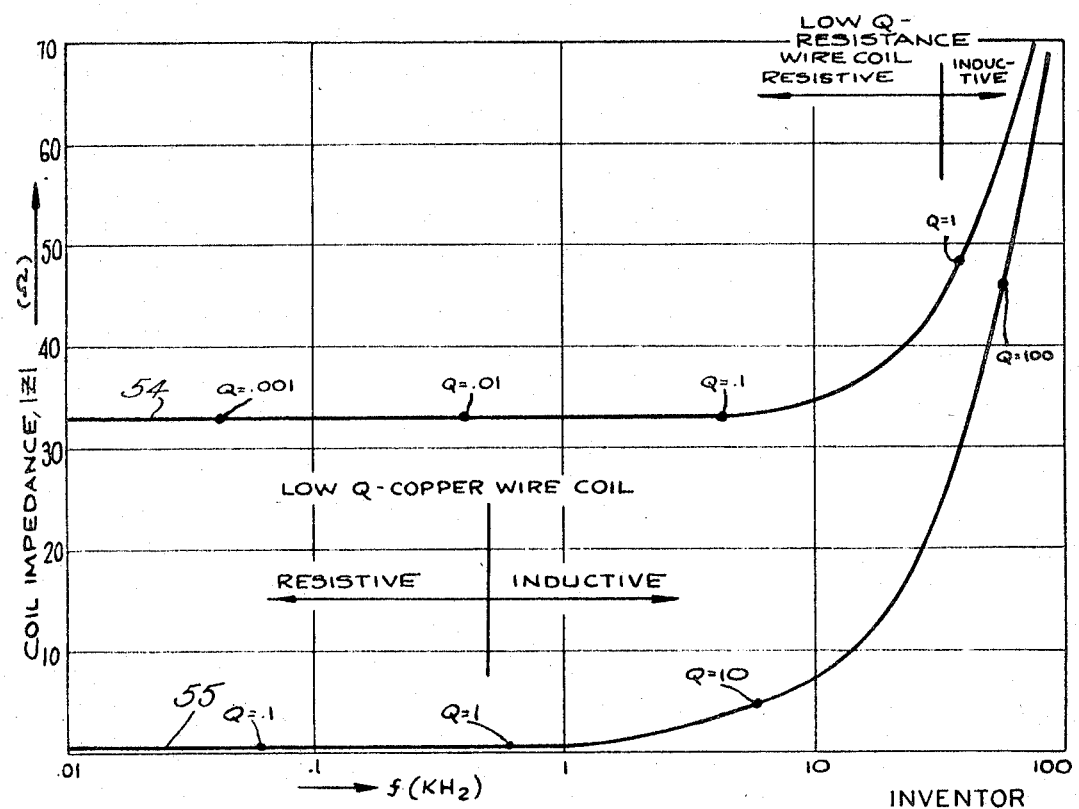

Other objects, features and advantages of the present invention will become apparent in connection with the following description, the appended claims and the accompanying drawings in which:

FIG. 1 is a circuit diagram of a simplified eddy current testing instrument having test coils wound of high resistance wire to provide low Q operation;

FIGS. 2a–c are waveforms for the circuit in FIG. 1;

FIGS. 3a and b are peak voltage vs. frequency plots for the circuit of FIG. 1;

FIG. 4 is a circuit diagram of an eddy current testing instrument having differential test coils; and FIG. 5 is a graph useful in explaining low Q operation according to the present invention.

Referring more particularly to FIG. 1, there is illustrated a simplified eddy current testing instrument which comprises an alternating current generator 10 whose frequency can be adjusted over a predetermined range of test frequencies. The waveform generated by generator 10 may be senusoidal or complex such as a square wave or a triangular wave. Generator 10 is connected to a primary coil 12 which generates a magnetizing field into which samples to be tested, such as sample 14, are inserted. A secondary coil 16 serves as a pickup coil to sense variations in the magnetizing field caused by eddy currents in the sample and provide test signals representing such variations. Coil 16 is connected to an integrating circuit 18 comprising an operational amplifier 20 having a series input resistor 22 and an integrating feedback capacitor 24. Resistor 22 and capacitor 24 are chosen such that amplifier 20 integrates the test signal from coil 16 at all test frequencies within the predetermined range of test frequencies. Although a single capacitor 24 would be used over a frequency range of say 10 to 1, bank of capacitors would be used over a wide frequency band with predetermined capacitors being switched into the circuit at different test frequency ranges to maintain accurate integration. Amplifier 20 has the usual reset circuit 25 to prevent integrator runaway. The output of amplifier 20 is in turn connected to an alternating current peak voltameter 28 and to the vertical deflection plates 30 on an oscilloscope 32. The horizontal deflection plates 34 of oscilloscope 32 are connected to the output of generator 10 across the primary energizing winding 12. Meter 28 and oscilloscope 32 provide a readout to detect amplitude and phase deviations in the integrated test signal. Meter 28 is used since amplitude variations may be difficult to detect on oscilloscope 32.

Except for the construction of coils 12 and 16, the incorporation of integrator 18 and the variable frequency generator 10, the remainder of the circuit, particularly the readout comprising meter 28 and oscilloscope 32, may be generally conventional and is described herein only to the extent necessary to an understanding of the present invention. At any given frequency set on generator 10 and in the absence of specimen 14, the test signal developed by coil 16 and integrated by integrator 18 is monitored on meter 28 and displayed along with the output of generator 10 on the oscilloscope 32. When coil 16 is then loaded by specimen 14, either the phase or the amplitude, and usually both, of the test signal will change and the changes are detected and measured on meter 28 and scope 32 according to known techniques.

According to the present invention coils 12, 16 are wound to have a Q that is low, many times lower than the Q of prior art coils commonly wound of copper wire. As is well known, the quality factor, Q, is equal to $\omega L/R$ where $\omega = 2\pi(f)$, $f$ is the operating frequency, $L$ is the inductance of the coil and $R$ is the equivalent coil resistance. In the preferred embodiment, the equivalent coil resistance is determined by the resistance of the wire from which coils 12, 16 are wound and hence the equivalent coil resistance is an intrinsic resistance and the Q is an intrinsic Q. However, certain advantages can also be realized by connecting a large resistor in series with higher Q coils so that the equivalent coil resistance is an apparent coil resistance and the Q is an apparent Q. In the preferred embodiment the coils are constructed so that Q does not exced 0.1 at the highest frequency in the range for which the instrument is designed to operate. The lower limit on Q of a coil that is actually used will be determined primarily by minimum signal level requirements depending on the signal-to-noise ratio that can be tolerated at the gain of amplifier 20 required to maintain accurate integration.

Although operation at a Q of at most no more than 0.1 is preferred, in general useful results can be obtained using coils having a higher Q of up to one at the highest frequency within the test frequency range. Coils may be operated in either a predominantly resistive mode or in a predominantly inductive mode, depending upon the operating frequency, with the transition occurring at a frequency corresponding to a Q of one, i.e., the frequency at which the resistive impedance is equal to the inductive impedance. According to the present invention the coils are operated in a predominantly resistive mode at a Q of at most no more than one for the highest frequency within the range of test frequencies. At a Q of one, the resistive component of the current in the coil will be down 3-db from its direct current value and hence a Q of one provides an upper limit for a 3-db band width. Stated differently the total impedance magnitude at a Q of one is up 3-db from the resistive or direct current impedance of the coils. Operating at a low Q of at most no more than one, and preferably less than 0.1, assures that inductive impedance variations with frequency will be small compared to the resistance of the coils over the test frequency range and hence the coil operation will be frequency independent. Coil 16 will accurately detect the rate of change of the magnetizing field generated by coil 12 and the output voltage developed at coil 16 will vary as a function of the derivative of the magnetizing field.

Figure 2:
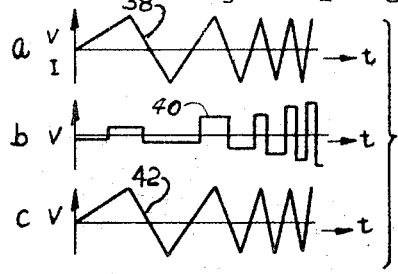

The purpose and function of operating coils 12 and 16 at a low Q will be more apparent in connection with the operation of integrator 18 and the waveforms illustrated in FIGS. 2 and 3. Assuming that the output of generator 10 has a triangular waveform and is increased in frequency as illustrated in FIG. 2a and designated by 38, the magnetizing current and voltage at coil 12 and the magnetizing field will all be substantially in phase at all frequencies due to the low Q operation of coil 12. The low Q coil 16 detects the rate of change of the magnetizing field and provides an output signal which varies as a function of the derivative of the field. Thus the test signal developed in coil 16 will have a square waveform 40 (FIG. 2b), 90° out of phase with the voltage waveform 38. The square wave test signal is then integrated by the integrator 18 to shape the square wave 40 back into a triangular waveform 38 as illustrated by the integrator output waveform 42 in FIG. 2c. The integrator output is taken so as to be in phase with the magnetizing voltage and current. The output level at integrator 18 can be increased as desired by amplification (not shown). For sinusoidal inputs to integrator 18, integrator 18 provides a 90° phase shift accompanied by amplitude variations with frequency that are inversely proportional to amplitude variations with frequency caused by the differentiator action of the coil 16.

FIGS. 3a and b illustrate peak amplitude variations plotted against frequency. With sample 14 removed and coil 16 unloaded, the peak voltage output 44 (FIG. 3a) across coil 16 is a substantially linear variation, increasing in amplitude with increasing frequency at generator 10. The linear variation with frequency is due to coil 16 sensing the rate of change of the magnetizing field. When coil 16 is loaded by sample 14, the peak voltage output across coil 16 will change with frequency depending on eddy currents in the sample. An exemplary plot of the voltage output when coil 16 was loaded with an aluminum rod is designated 48 in FIG. 3a. It is noted that because the output of coil 16 unloaded varies linearly with frequency, the voltage output at coil 16 with sample 14 inserted could be corrected to obtain a true indication of the change caused by the sample. For certain applications using sinusoidal drive signals it is possible to eliminate integrator 18 and read the voltage output at coil 16, making suitable corrections for variations in the voltage output due to frequency alone. However, integrator 18 will shape the output from coil 16 to automatically correct for voltage variations with frequency caused by coil 16 sensing the rate of change of the field. When the output at coil 16 is integrated, the integrated peak voltage over the frequency range of interest will be level as at 52 in FIG. 3b. With this flat frequency response, when sample 14 is inserted the integrated output 53 will have variations due solely to the sample. Thus, the low Q secondary coil 16 in combination with the integrator 18 will provide amplitude and phase variations with variations in frequency that are related only to the sample.

Although both coils 12, 16 are constructed with a low Q in the preferred embodiment, each of the coils provides certain advantages independent of the other coil. A low Q secondary coil 16 would be useful with high Q primary coils for many eddy current testing applications. Wide band testing using only a low Q secondary coil will have frequency independent operation as explained above if the magnetizing field strength level is held constant with frequency as by using a constant current source. However by using a low Q primary winding 12 the complex impedance does not vary substantially with frequency and generator 10 need not necessarily be a constant source. Another advantage in using a low Q primary coil 12 is that the magnetizing field developed by coil 12 will be substantially in phase with the magnetizing voltage and current supplied by generator 10 over a wide frequency range and complex waveforms will not be distorted. This provides special advantages where the magnetizing voltage is used as a reference in readout circuits such as oscilloscope 32, particularly where it is desirable to know the phase of the reference signal or to maintain the phase and amplitude of the reference signal constant over a wide frequency range.

Although not essential to obtain low Q operation of coils 12, 16, in the preferred embodiment coils 12 and 16 are wound of high resistance wire. The use of high resistance wire will effectively achieve low Q operation over a wider frequency range than the same coil wound of copper wire. Various different high resistance wire compositions are known per se in the art of wire wound resistors, such as used in rheostats and heaters. The most important characteristic in selecting a particular wire is its resistivity which should be high. The wire should have a negligible temperature coefficient of resistance and preferably be non-magnetic. Thus, well known alloy resistance wires having nickel-chromium compositions and nickel-chromium-iron compositions are contemplated. Many of these compositions have a specific resistivity in the range of 600–800 ohms per cir-mil-ft, approximately 60–80 times greater than that of copper. Many of the resistance wire compositions also have low temperature coefficients of resistance which are desirable.

In the preferred embodiment of the present invention, coils 12, 16 are wound of an alloy wire whose composition is 75% nickel, 20% chromium, 3% aluminum and 2% cobalt, by weight. This particular wire has been used for wire wound resistors and is sold commercially under the trade name "Moleculoy" by the Molecu-Wire Corporation, a subsidiary of Superior Tube Company, Norristown, Pa. This particular wire is nonmagnetic and has a high specific resistivity of 800 ohms per cir-mil-ft and a very low temperature coefficient of resistance. This particular wire has a further desirable property in that its tensile strength is high by comparison to copper wire. By way of further illustration, substantially pure copper wire has a specific resistivity of 10.06 ohms per cir-mil-ft. and a high temperature coefficient of resistance.

By way of further example, Moleculoy wire was used in a feed-through coil having the primary coil wound on top of the secondary coil. The secondary coil had an inside diameter of 11.5 mm., a medium diameter of 14 mm. and a length of 9 mm. The secondary coil had 250 turns of No. 37 Moleculoy wire and a resistance of 1.35 kilo-ohms. The primary coil contained 95 turns of No. 24 Moleculoy wire and a resistance of 33.8 ohms. The inductive reactance of these coils was negligible relative to the resistance over a wide frequency range with a Q of 0.1 at approximately 4.35 kHz. and a Q of 1 at approximately 43.5 kHz. The frequency response of this coil is shown in FIG. 5 and designated at 54. Thus, the 3-db bandwidth for this coil has an upper limit at 43.5 kHz. By comparison the frequency response of the same coil configuration but wound of copper wire is shown at 55 in FIG. 5.

As will be apparent from FIG. 5, the coil wound of high resistance wire provides substantial band width improvement over the same coil wound of copper wire. The coil operates predominantly in the resistive mode at a constant impedance from a direct current up to 4.35 kHz. and at a substantially constant impedance up to 43.5 kHz. where the response is of 3-db which can be tolerated for many applications. The low Q coil wound of copper wire has an upper limit of 0.6 kHz. for a 3-db bandwidth. Thus the low Q operation of the coil wound of resistance wire is extended about seventy times higher than the low Q operation of the same coil wound of copper wire for a 3-db bandwidth. The bandwidth improvement achieved by winding the coils of high resistance wire is proportional to the increase in resistivity of the high resistance wire as compared to the resistivity of the copper wire. It will also be apparent that for a given test problem to be conducted at a frequency of 0.06 kHz., additional turns could be added to the coil wound of high resistance wire to obtain larger output signals while operating at a Q of 0.1 by comparison to a coil wound of copper wire at a Q of 0.1. Coils wound of high resistance wire also eliminate self resonance, or at least, minimize the effect of self resonance.

The frequency independent operation can be utilized even more effectively in eddy current instruments having differential coil circuits such as shown in FIG. 4. In FIG. 4, circuit components that are the same as those in FIG. 1 are indicated by like reference numerals. The single coil 12 (FIG. 1) is replaced by a pair of primary coils 60, 62 and correspondingly the secondary coil 16 is replaced with a pair of oppositely phased secondary coils 64, 66. Coils 64, 66 are connected to the summing point input of integrator 18 so that the input to the integrator is the difference signal. In the preferred embodiment, coils 60, 62, 64, 66 are all wound of resistance wire to have a very low Q as described hereinabove. By using high resistance wire, the coils in each coil pair, coils 60, 62 and coils 64, 66, can be closely matched. Since the impedance of each coil is primarily resistive, it is a relatively simple matter to match the coil impedances either during winding of the coils or by using a trimmer resistor 68 in the coil circuit.

In the absence of any samples, the output of coils 64, 66 is balanced as by adjusting resistor 68 so that the integrator output is zero. A standard sample 70 is then inserted in one primary-secondary set, coils 60, 64, and a test sample 72 is inserted into the other primary-secondary set, coils 62, 66. Any difference in the two samples 70, 72 will cause an unbalance in the secondary coils 64, 66 and the difference signal is integrated and indicated on meter 28 and oscilloscope 32. Except for the differential indications (FIG. 4) as compared to the indications obtained with the circuit of FIG. 1, the operation of the low Q coils and the integrator are substantially the same as described in connection with FIG. 1.

Thus, the differential indications at meter 28 and oscilloscope 32 will be frequency independent, representing only differences in the samples 70, 72.

The circuit of FIG. 4 could also be operated as an absolute testing instrument wherein samples are inserted into only one of the coil sets such as coils 62, 66 with the coil pair 60, 64 always being empty. Any deviation in the characteristics of the samples inserted into the coil pair 62, 66 will provide a different indication on meter 28 and oscilloscope 32. The use of low Q coils in an absolute testing instrument is particularly advantageous because the coil pair 60, 64 and the coil pair 62, 66 can be balanced initially and the balance will be maintained over a wide frequency range. By using coils wound of high resistance wire, the initial balance will also be maintained over wide variations in ambient temperature.

It is to be understood that one of the principal aspects of the present invention is the use of low Q coils. For certain applications, a test coil such as the coil 16 could be wound of copper wire if the frequency or frequency range at which measurements are to be taken is low enough such that the Q of the coil is also low, for example, within the limits previously set forth above. In order to obtain the advantages of the integrator 18, the construction of the coils (16, FIG. 1; 64, 66, FIG. 4) and the test frequency must be such that the coils are operating at a low Q to preserve the differentiator action of the coils. This combination of differentiation and then integration will provide frequency independent operation. Although operation at low Q has been described hereinabove primarily based on the intrinsic Q of the coil, many of the advantages could be obtained using coils having a higher intrinsic Q by reducing the apparent Q of the coils as by adding a suitable series resistor. Thus, the apparent coil resistance would be determined by the resistance of the wire and by the series resistor.

What is claimed is:

1. A wideband, eddy current testing apparatus for determining characteristics of a test sample comprising a variable frequency device for supplying alternating current selectively at any predetermined frequency within the wideband capability of said testing apparatus, a primary coil operatively coupled to said source to generate an alternating magnetic field at said predetermined frequency, a secondary coil magnetically coupled to said field, and secondary circuit means including said secondary coil and having a pair of terminals, said coil and said circuit means being arranged such that said coil sesnes the rate of change of said field and an electrical signal is developed at said terminals which varies as a function of the derivative of said field, and wherein said circuit means includes a high resistive impedance across said terminals relative to its inductive impedance across said terminals at said predetermined frequency and the quality factor, Q, of said circuit means at said terminals is no more than one at said predetermined frequency.

2. The apparatus set forth in claim 1 wherein said secondary coil has an intrinsic resistance that is high relative to the inductive impedance of said coil at said predetermined frequency and the intrinsic Q of said coil is no more than one at said predetermined frequency.

3. The apparatus set forth in claim 2 wherein said secondary coil is wound of high resistance wire having a specific resistivity substantially greater than the specific resistivity of copper.

4. The apparatus as set forth in claim 1 further comprising an integrating circuit operatively connected to said terminals of said secondary circuit means and responsive to said derivative signal developed at said terminals to provide an output signal which varies proportionally to variations in said field due to eddy currents when a sample is inserted into said field.

5. A wideband eddy current testing apparatus comprising means for providing a magnetic field which varies at any predetermined frequency within the wideband frequency range of said apparatus, test coil circuit means including a test coil linking said field and adapted to provide a first output signal in response to variations in said field, said test coil circuit being constructed to operate at a relatively low Q of no more than one at the highest frequency within said range so that said test coil circuit means detects the rate of change of said magnetic field and said first output signal varies substantially in accordance with the derivative of said field, and an integrating circuit operatively coupled to said test coil circuit means to integrate said first output signal and thereby develop a second output signal whose phase and amplitude vary according to phase and amplitude variations of said field at all frequencies within said range.

6. A wideband magnetic testing apparatus for sensing alternating magnetic fields having a frequency within the wideband frequency range of said apparatus to determine characteristics of test samples in accordance with variations in said field when said samples are inserted therein, a variable frequency device for supplying alternating current whose frequency is selectively variable over said range, and test coil means operatively coupled to said device to provide a magnetic field and to sense variations therein when said coil means is located by a sample under test, said test coil means comprising a first coil wound of high resistance wire so as to have a Q of no more than one at all frequencies within said range, wherein Q is $\omega L/R$, $\omega$ is $2\pi f$, $f$ is the frequency of said alternating current, L is the inductance of said coil and R is the intrinsic coil resistance, said first coil further having a complex impedance that is primarily resistive and substantially constant over said frequency range.

7. The apparatus set forth in claim 6 wherein said coil has a Q on the order of 0.1 at the highest frequency within said range.

8. The apparatus set forth in claim 6 wherein said wire has a specific resistivity substantially greater than the specific resistivity of copper.

9. The apparatus set forth in claim 8 wherein the specific resistivity of said wire is on the order of 800 ohms per cir-mil-ft.

10. The apparatus set forth in claim 8 wherein said high resistance wire is an alloy comprising nickel and chromium.

11. The apparatus set forth in claim 10 wherein said alloy further comprises iron.

12. The apparatus set forth in claim 10 wherein said alloy comprises substantially 75% nickel and 20% chormium by weight.

13. The apparatus set forth in claim 6 wherein said first coil is a secondary coil, said test coil means further comprises a second coil connected to said device and serving as a primary coil to generate said field, said first coil is operatively coupled with said second coil such that the first coil develops a first output signal in response to said field and variations in said field when said first coil is loaded by said sample, said first coil senses the rate of change of said field and provides an electrical signal which varies as a function of the derivative of said field, said first coil having an intrinsic Q of no more than one at all frequencies within said range and further having a complex impedance that is primarily resistive and substantially constant over said wideband frequency range.

14. The apparatus set forth in claim 13 wherein said second coil is also wound of high resistance wire so that the intrinsic Q of said second coil is no more than one at all frequencies within said range and wherein said second coil also wound of high resistance wire so that resistive and substantially constant over said wideband frequency range.

15. The apparatus set forth in claim 13 wherein integrating circuit means are coupled to said first coil to integrate said electrical signal and shape said electrical signal in a manner inversely proportional to that caused by said first coil operating as a differentiator and to thereby provide an output signal that is constant over said frequency range in the absence of a sample.

16. The apparatus set forth in claim 15 further comprising output means operatively coupled to said integrating circuit means and to said source and responsive to said second output signal and to said alternating current to provide an indication representative of phase and amplitude deviations of said second output signal from said alternating current when said first coil is loaded by said sample.

17. The apparatus set forth in claim 16 wherein said second coil is also wound of high resistance wire and the Q of said second coil is no more than one at the highest frequency within said range so that in the absence of a sample said field is substantially in phase with the magnetizing voltage at said second coil.

18. The apparatus set forth in claim 13 wherein said test coil means further comprises a third coil also serving as a secondary coil, said third coil also being wound of high resistance wire so as to have a complex impedance that is primarily resistive and substantially constant over said wideband frequency range and a Q of no more than one at the highest frequency within said range, and wherein said first and said third coils are operatively coupled to each other and to an integrating circuit means so that said integrating circuit means receives an input signal corresponding to the difference between signals developed in said first and said third coils and provides an output representing variations in said field when a sample is inserted therein at all frequencies within said range.

References Cited

UNITED STATES PATENTS

| 2,594,947 | 4/1952 | Lynch | 324—34 |
| 3,273,056 | 9/1966 | Flaherty et al. | 324—40 |
| 3,281,809 | 10/1966 | Andersson | 324—34 X |

RUDOLPH V. ROLINEC, Primary Examiner

A. E. SMITH, Assistant Examiner

U.S. Cl. X.R.

336—222

PO-1050
(5/69)

UNITED STATES PATENT OFFICE
CERTIFICATE OF CORRECTION

Patent No. 3,464,002　　　　　Dated August 26, 1969

Inventor(s) Rudolf G. Hentschel

It is certified that error appears in the above-identified patent and that said Letters Patent are hereby corrected as shown below:

In the specification, Column 3, line 20 "senusoidal" should be - - sinusoidal - - ; same Column, line 34, before "bank" should be - - a - - ; Column 6, line 26 "of" should be - - off - - .

In the Claims, Column 7, Claim 1, line 49, "sesnes" should be - - senses; Column 8, Claim 14, line 70, "also wound of high resistance wire so that" should read - - has a complex impedance that is primarily - - .

SIGNED AND SEALED

APR 28 1970

(SEAL)
Attest:

Edward M. Fletcher, Jr.
Attesting Officer

WILLIAM E. SCHUYLER, JR.
Commissioner of Patents